United States Patent
Nilsson et al.

(10) Patent No.: US 12,132,531 B2
(45) Date of Patent: Oct. 29, 2024

(54) COHERENT SUMMING OF SIGNALS FROM DISTRIBUTED RADIO ACCESS POINTS

(71) Applicant: Telefonaktiebolaget LM Ericsson (publ), Stockholm (SE)

(72) Inventors: Magnus Nilsson, Lund (SE); Peter Jakobsson, Lund (SE); Jan Celander, Malmö (SE); Martin Isberg, Lund (SE); Torsten Carlsson, Lund (SE); Magnus Sandgren, Staffanstorp (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 80 days.

(21) Appl. No.: 18/021,851

(22) PCT Filed: Aug. 20, 2020

(86) PCT No.: PCT/EP2020/073387
§ 371 (c)(1),
(2) Date: Feb. 17, 2023

(87) PCT Pub. No.: WO2022/037784
PCT Pub. Date: Feb. 24, 2022

(65) Prior Publication Data
US 2023/0379009 A1    Nov. 23, 2023

(51) Int. Cl.
*H04B 7/024* (2017.01)
*H04B 7/08* (2006.01)

(52) U.S. Cl.
CPC .......... *H04B 7/024* (2013.01); *H04B 7/0857* (2013.01)

(58) Field of Classification Search
CPC ..... H04B 7/024; H04B 7/0857; H04B 7/0837
See application file for complete search history.

(56) References Cited

U.S. PATENT DOCUMENTS

| | | |
|---|---|---|
| 2005/0219122 A1 | 10/2005 | Kawasaki |
| 2017/0093465 A1 | 3/2017 | Molev Shteiman et al. |
| 2022/0286193 A1* | 9/2022 | Frenger ................. H04L 5/0035 |

OTHER PUBLICATIONS

Interdonato, Giovanni , "Signal Processing Aspects of Cell-Free Massive MIMO", Linköping Studies in Science and Technology Licentiate Thesis No. 1817, Licentiate Thesis, Linkoping University, 2018, 1-49.

(Continued)

*Primary Examiner* — Vineeta S Panwalkar
(74) *Attorney, Agent, or Firm* — Murphy, Bilak & Homiller, PLLC (57) ABSTRACT

A first antenna processing node receives (710) one or more wireless transmissions from a wireless device and obtains first symbol values from the one or more wireless transmissions. The first antenna processing node receives (720) second symbol values from a second antenna processing node, the second symbol values corresponding to the one or more wireless transmissions as received at the second antenna processing node, and calculates (730) a first weight parameter based on at least a subset of the first symbol values and a corresponding subset of the second symbol values. The first antenna processing node calculates (740) third symbol values by computing a weighted sum of first symbol values and corresponding ones of the second symbol values, using the first weight parameter, and sends (750) the third symbol values to a third antenna processing node or to a controlling node. This combining of symbol values may approximate maximum ratio combining, MRC.

19 Claims, 8 Drawing Sheets

(56) References Cited

OTHER PUBLICATIONS

Vieira, Joao, et al., "A receive/transmit calibration technique based on mutual coupling for massive MIMO base stations", 2016 IEEE 27th Annual IEEE International Symposium on Personal, Indoor and Mobile Radio Communications—(PIMRC): Fundamentals and PHY, 2016, 1-6.

Vieira, Joao, et al., "Reciprocity Calibration for Massive MIMO: Proposal, Modeling and Validation", IEEE Transactions on Wireless Communications, vol. 16, Issue 5, May 2017, 1-15.

* cited by examiner

COHERENT SUMMING OF SIGNALS FROM DISTRIBUTED RADIO ACCESS POINTS

The present disclosure generally relates to wireless systems in which a central processing unit for a base station is coupled to a series of spatially separated transmitting and receiving antenna points via serial interfaces. The present disclosure relates more particularly to combining of signals received from a wireless device by two or more of the antenna points.

BACKGROUND

The term "cell-free massive MIMO" has been used to refer to a massive Multiple-Input Multiple-Output (MIMO) system where some or all of the transmitting and receiving antennas for a base station are geographically distributed, apart from the base station. Each of the transmitting and receiving points may be referred to as an "antenna point," "antenna processing node," or "antenna processing unit." These terms may be understood to be interchangeable for the purposes of the present disclosure, with the abbreviation "APU" being used herein. These APUs are communicatively coupled to and controlled by a controlling node, which is spatially separate from some or all of the APUs, may be referred to interchangeably as a "central processing node" or "central processing unit"—the abbreviation "CPU" is used herein.

Figure 1:
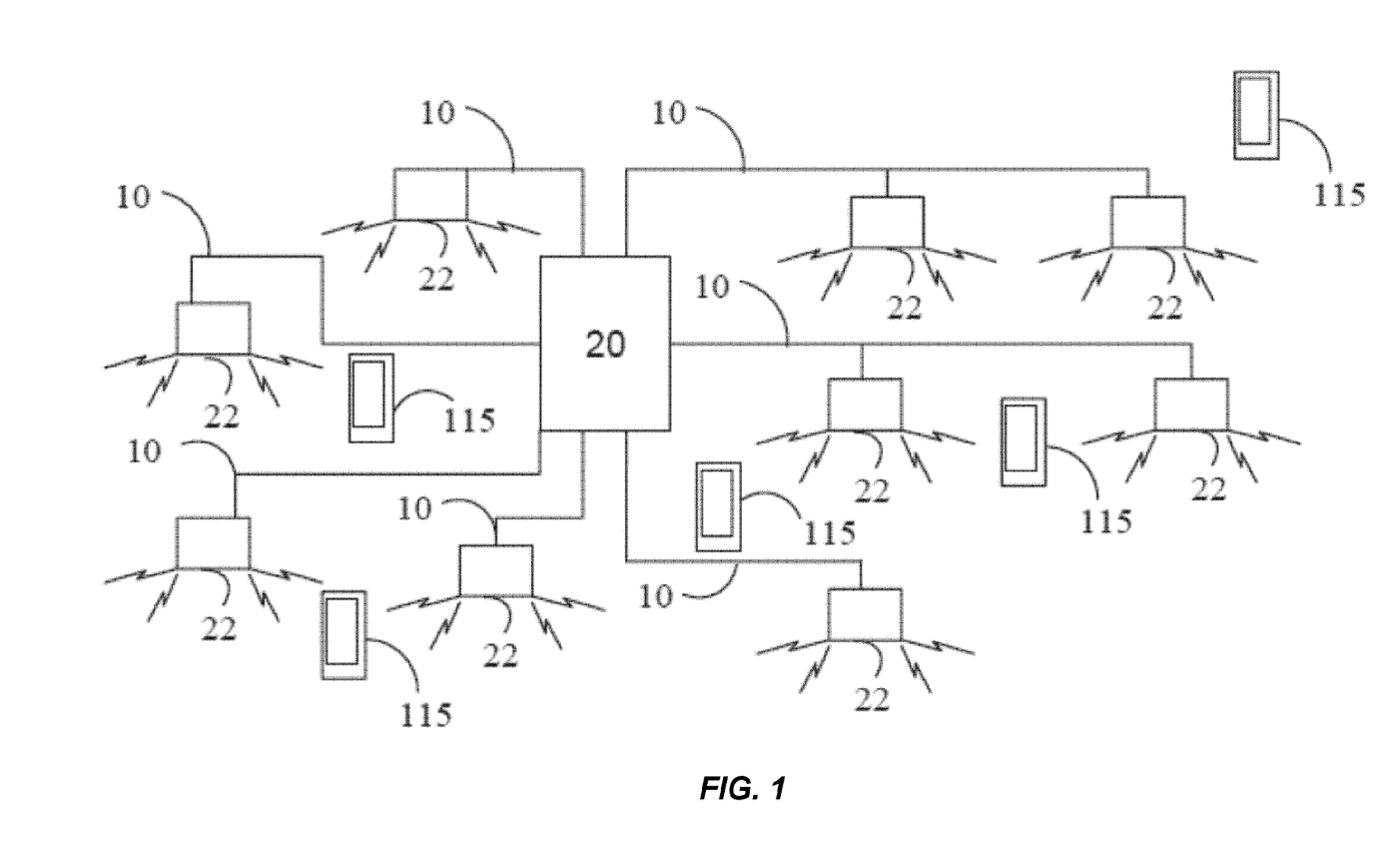
FIG. 1 is an illustration of an example cell-free massive MIMO system.

FIG. 1 provides a conceptual view of a cell-free massive MIMO deployment, comprising a CPU 20 connected to several APUs 22, via serial links 10. As seen in the figure, each of several user equipments (UEs) 115 may be surrounded by one or several serving APUs 22, all of which may be attached to the same CPU 20, which is responsible for processing the data received from and transmitted by each APU. Each UE 115 may thus move around within this system without experiencing cell boundaries.

Figure 2:
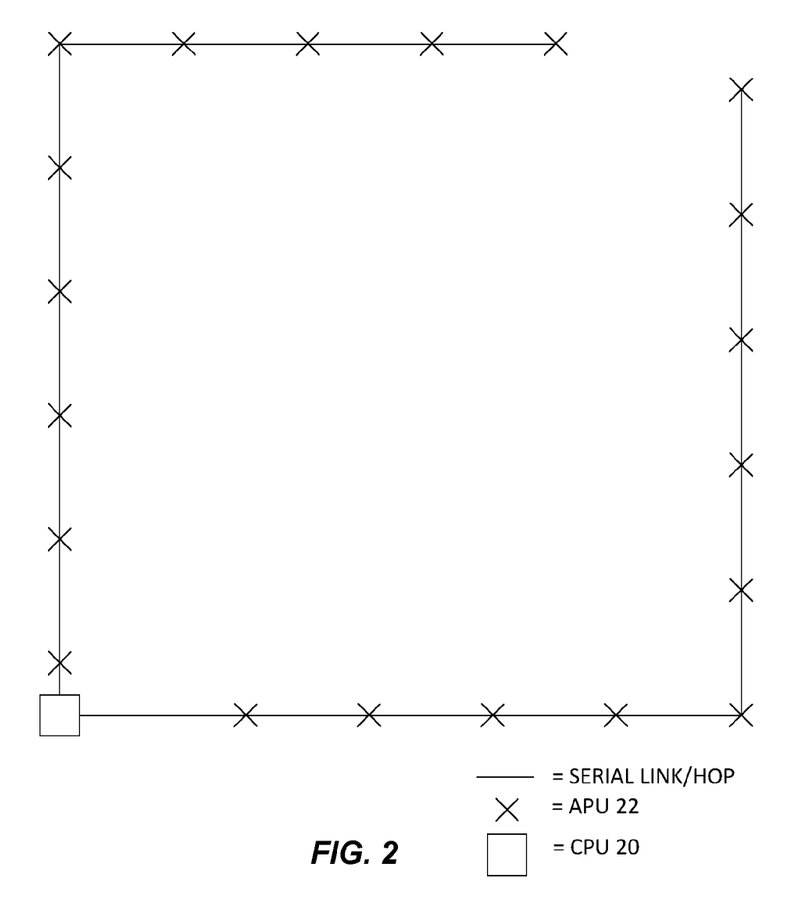
FIG. 2 illustrates an example deployment of a distributed wireless system.
Figure 3:
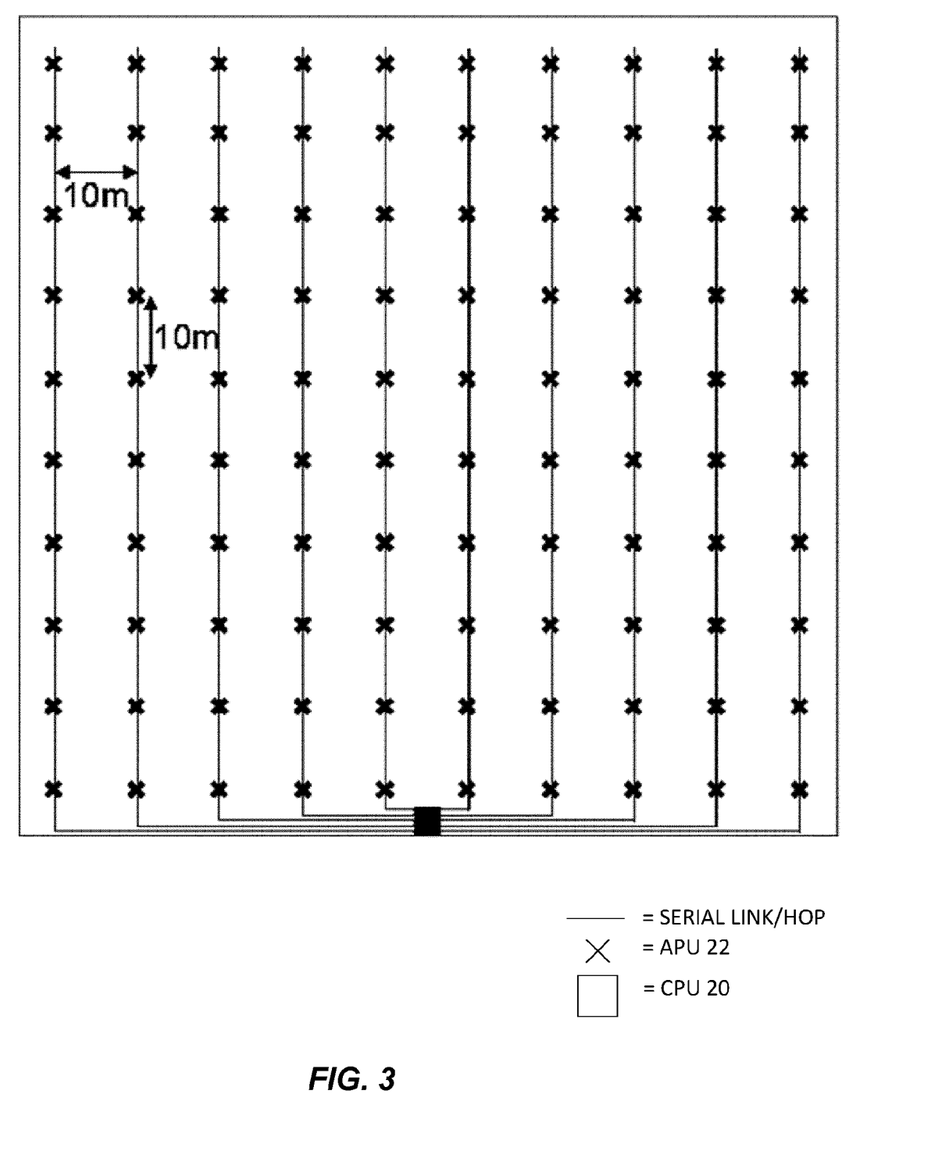
FIG. 3 illustrates another example deployment of a distributed wireless system.

Systems described herein include at least CPU and two or more APUs spatially separated from each other and from the CPU. These systems, which may be considered examples of cell-free massive MIMO deployments, will be called distributed wireless systems herein. FIGS. 2 and 3 provide other views of example deployments of distributed wireless systems. In this scenario shown in FIG. 2, multiple APUs 22 are deployed around the perimeter of a room, which might be a manufacturing floor or a conference room, for example. Each APU 22 is connected to the CPU 20 via a "strip," or "stripe." More particularly, the CPU 20 in this example deployment is connected to two such stripes, each stripe comprising a serial concatenation of several (10, in the illustrated example) APUs 22. FIG. 3 shows an two-dimensional model of a factory floor with densely populated APUs 22 connected to the CPU 20 via several such "stripes." As a general matter, the CPU 20 can target a UE anywhere in the room by controlling one or several APUs 22 that are closest to the UE to transmit signals to and receive signals from the UE. In this example deployment, the APUs are spaced at 10 meters, in both x- and y-directions, which means that a UE is never more than about 7 meters away from one (or several) APUs, in the horizontal dimension.

It will be appreciated that the distribution of base station antennas into APUs as shown in FIGS. 1-3 can provide for shorter distances between the base station antennas and the antenna(s) for any given UE served by the base station, in many scenarios. This will be an enabler for the use of higher carrier frequencies, and thereby higher modulation/information bandwidths, both of which are key expectations for fifth-generation (5G) wireless networks.

Another requirement of 5G networks is that they support a high quality-of-service (QoS). To achieve this, it is necessary that the radio link between the mobile/device/machine (UE) and the base station be highly reliable and support low-latency communications. This is especially the case for industrial scenarios, for example, where mission-critical real-time communication is needed for communications with or between machines equipped with devices.

SUMMARY

To improve signal-to-noise ratio (SNR) for uplink transmissions, I-Q data from multiple APUs in a distributed wireless system can be added together, preferably in a coherent fashion. This can be done by a CPU, like those described above, e.g., after I-Q data from each APU receiving the transmission is forwarded to the CPU over the serial link. However, this puts severe demands on the serial links connecting the APUs to the CPUs.

In the techniques described herein, signal data from multiple APUs is added together serially, as the signal data is sent "upstream," towards the CPU. Consequently, only a combined version of the signal data ultimately reaches the CPU, and only one version of the data need be sent over any given serial link in the chain. This merging of I-Q data in each APU reduces the needed information bandwidth in the serial link (stripe), which otherwise would increase for every APU added in series.

At the same time, signal sensitivity may be significantly improved, as each APU can take advantage of cross-correlation information to determine how best to combine the data. Interference level in the system is reduced and thus the system capacity can be significantly improved. Each UE gets better SNR in the uplink, and can thus increase its bitrate. In URLL (ultra reliable, low latency) scenarios, better SNR and thus lower BER are obtained, thus reducing or eliminating time-consuming retransmissions.

An example method, according to some embodiments, is carried out in an antenna processing node of a distributed wireless system that comprises a controlling node, the antenna processing node, and one or more additional antenna processing nodes, where each of the antenna processing nodes are communicatively coupled to the controlling node but are spatially separated from each other and from the controlling node. According to this example method, the first antenna processing node receives one or more wireless transmissions from a wireless device and obtains first symbol values from the one or more wireless transmissions. The first antenna processing node receives second symbol values from a second antenna processing node, the second symbol values corresponding to the one or more wireless transmissions as received at the second antenna processing node, and calculates a first weight parameter based on at least a subset of the first symbol values and a corresponding subset of the second symbol values. The first antenna processing node calculates third symbol values by computing a weighted sum of first symbol values and corresponding ones of the second symbol values, using the first weight parameter, and sends the third symbol values to a third antenna processing node or to a controlling node. This combining of symbol values may approximate maximum ratio combining, MRC.

Details and variants of the methods summarized above are provided below. Further, controlling node apparatuses and antenna processing node apparatuses configured to carry out the methods summarized above and variants thereof are described in the detailed description below, and illustrated in the attached figures.

DETAILED DESCRIPTION

There are several possible approaches for implementing the interconnections between the CPU in a distributed wireless system and the APUs that it controls. One approach is to implement the interconnections between the CPUs and the APUs as a high-speed digital interface, e.g., such as a high-speed Ethernet connection. With this approach, information to be transmitted by a given APUs is sent from the CPU to the APU as digital baseband information. This digital baseband information is then up-converted to a radiofrequency (RF) signal in the APU, for transmission over the air. In the other direction, RF signals received from a UE are downconverted in the APU and converted to digital form before being sent over the digital link to the CPU, for further processing.

Figure 4:
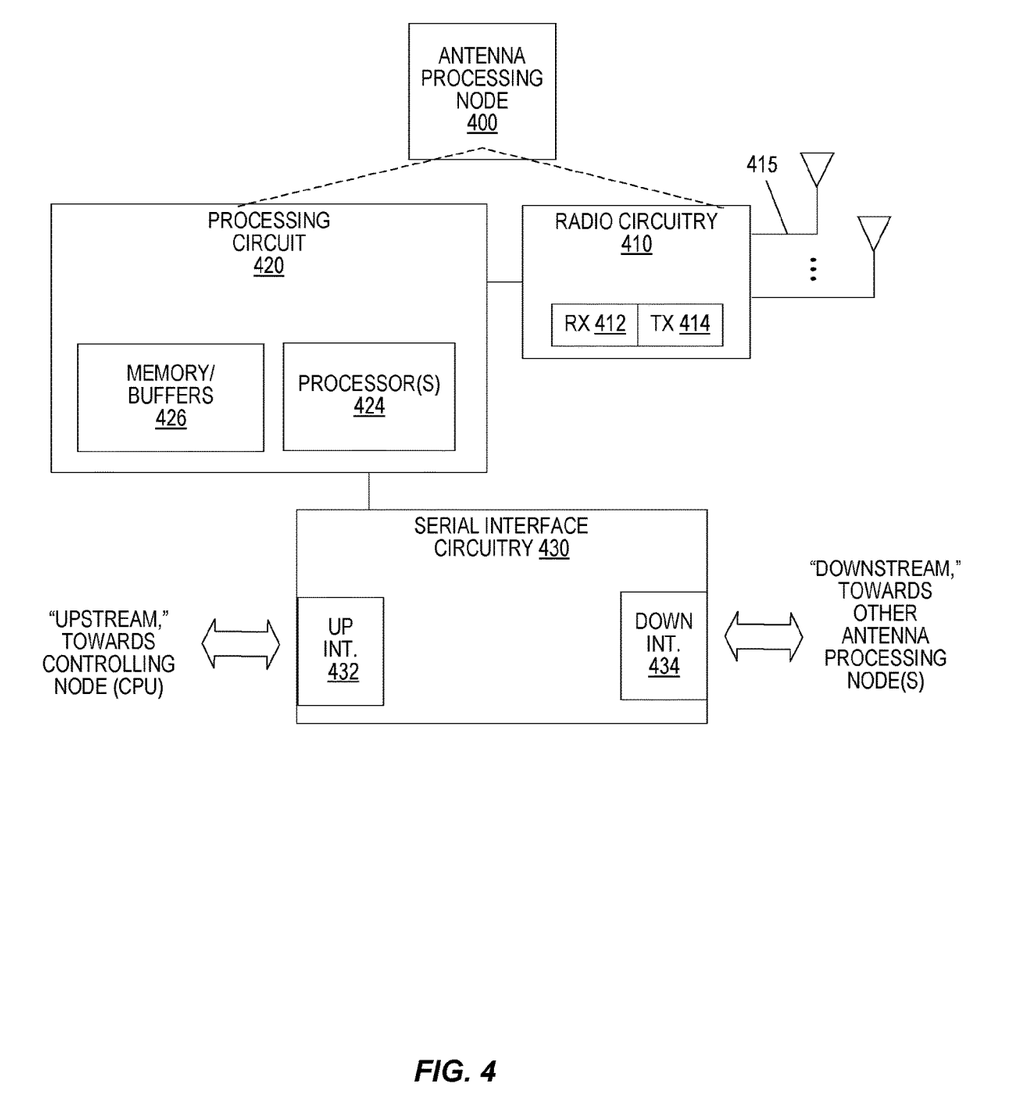
FIG. 4 is a block diagram of an example antenna processing node, according to some embodiments.

The techniques disclosed herein are described in the context of the first approach described above, i.e., in systems where a CPU is connected to multiple APUs via a series of serial links. However, these techniques are not necessarily limited to this approach. In such a system, communications along these serial links may be described as "upstream" and "downstream" communications, where upstream communications are communications in the direction towards the CPU while downstream communications are in the opposite direction, i.e., away from the CPU. In the upstream direction, each APU thus sends its own data towards the CPU, via an upstream serial interface, along with any data that it receives from one or more APUs that are further downstream, via a downstream serial interface. This is seen in FIG. 4, which is a block diagram illustrating components of an example APU, here illustrated as antenna processing node 400. As seen in the figure, the antenna processing node 400 also receives communications for itself and for downstream APUs from the CPU, via the upstream serial interface 432, and forwards those communications intended for downstream APUs towards those APUs, via the downstream serial interface 434.

The required capacity of the fronthaul network formed by these serial links is proportional to the number of simultaneous data streams that the APUs in the series can spatially multiplex, at maximum network load. The required capacity of the backhaul of the CPU (i.e., the CPUs connection towards the core network) is the sum of the data streams that the serial links connecting the APUs to the CPUs will transmit and receive at maximum network node. The most straightforward way to limit these capacity requirements is to constrain the number the number of UEs that can be served per APU and CPU. Put another way, the capacity of the distributed wireless system to serve UEs may be limited by the maximum capacities of the serial links between the APUs to the CPUs.

The use of serial interfaces as described above is generally a good match for downlink (DL) communications, i.e., communications from a base station to one or more UEs. Note that the terms "wireless device," "user equipment," and "UEs" are used herein to refer to any wireless devices served by the distributed wireless systems described here, including wireless devices that do not have a "user" as such but that are connected to machines. The serial interfaces described here work well for downlink communications because the same information may be sent to all of the APUs involved in any given transmission to a wireless device. This downlink information may be the bits or data blocks that must be transmitted by the APUs, with each APU involved in the transmission separately performing its own coding, modulation, upconversion, and transmission. There are other possibilities, however, such as the CPU sending to the APUs a time-domain digital representation of a modulated in-phase/quadrature (I/Q) signal, for upconversion and transmission, or the CPU sending to the APUs a frequency-domain digital representation of I/Q symbols, for OFDMA modulation, upconversion, and transmission by the APUs. In any of these cases, when the CPU sends this downlink information to two or more APUs in the chain, it need only send one copy, with each APU forwarding the information further downstream, as necessary.

In the uplink, however, information from each APU is unique. In addition, soft bits need to be sent to the CPU, for use in soft combining of retransmissions, for example. The information bandwidth is expected to be up to four times larger in the uplink if all of this unique information from several APUs receiving a given wireless device's transmission is sent to the CPU.

One possible approach to reducing this data being sent from the APUs to the CPU is to use distributed MIMO (D-MIMO) to add, coherently, the data from the APUs involved in receiving a given uplink transmission. However, this requires antenna calibration between the APUs, which has been shown to be a very difficult problem, especially when the APUs are physically separated and the operating frequency is high. There is a need for a method of coherent addition of uplink data from multiple APUs, without requiring antenna calibration.

Successive Coherent Combining

In the techniques described herein, the uplink IQ-data stream (soft bits) for a given received transmission can be combined/merged in each APU, as the data is sent towards the CPU from each APU. The combining of the signals from different APUs can be made in several ways. In the 5G systems known as "New Radio," or "NR, there are pre-defined reference signals for modulation, demodulation reference signals (DMRS), intended to allow the receiver to compensate the channel characteristics and demodulate the signal. This can be used to phase-shift each of the signals to enable a coherent addition. This is feasible in good signal conditions, i.e., when the signal-to-interference-plus-noise ratio (SINR) is high. However in bad signal conditions (low SINR) or when signals are carried by poor radio channels (e.g., with low coherence bandwidth and low coherence time), the channel estimates obtained from the reference signals alone might not be good enough for coherent addition to work well.

The techniques described herein are based on the fact that the absolute phase of the signals does not matter when adding multiple signals together coherently. As will be seen below, this means that additional information available from the received signals can be exploited to make sure the signals are added coherently, rather than relying on only the DMRS signals.

Figure 5:
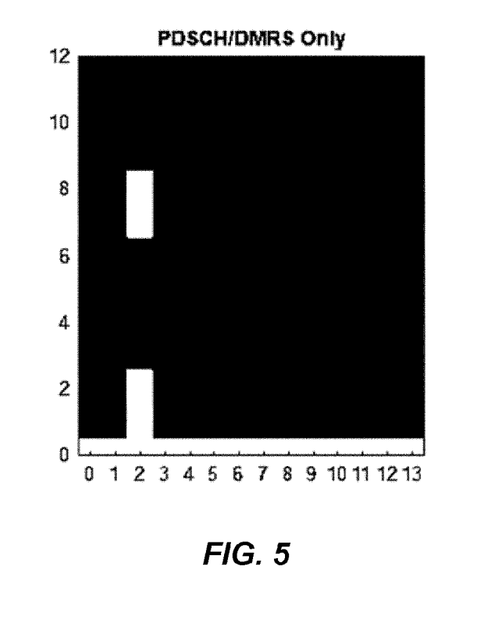
FIG. 5 illustrates an example of demodulation reference signal (DMRS) density in an NR channel.

In FIG. 5, an example mapping of DMRS to a resource block in a NR downlink shared channel (DLSCH), illustrated here as a Physical Downlink Shared Channel (PDSCH), is shown. Here we can see that only four out of the available 12×14=168 resource elements in the resource block are used for DMRS. Most of the remaining resource elements are used to carry user data. Similar quantities of DMRS are likely to be found in uplink transmissions.

A channel estimate performed using only the reference signal in these four resource blocks is necessarily limited in quality. However, if information in the symbols in all 168 resource elements could be used, instead of just the four DRMS symbols, the processing gain is improved by $10*\log_{10}(168/4)=16$ dB. In the techniques described herein, this is done by exploiting the cross-correlation between the signals received at different APUs, to determine differences in channel conditions, rather than an absolute estimate of the channel. Using this information, as will be shown in detail below, the signals can be added coherently to make a proper maximum-ratio-combining (MRC) even in bad signal conditions. After the signals from two or more APUs are added together in this way, the resulting signal-to-noise ratio (SNR) is much more likely to be good enough for successful demodulation.

Of course, the signals from two or more APUs could be added together at the CPU, after the I-Q data streams from each APU are sent to the CPU. But, as discussed above, this puts high demands on the information bandwidth of the serial links connecting the CPU to the chain of APUs. In the techniques described herein, the signals from each APU are added to each other one at a time, as the I-Q data are propagated upstream. Thus, for instance, an APU at the end of a chain (or the last APU in the chain receiving a particular signal of interest) simply sends the I-Q data it obtained from the received signal to the next upstream APU. That APU, using the techniques detailed below, combines the I-Q data obtained from the downstream APU over the serial link with its own I-Q data corresponding to the received signal. That APU then passes the combined signal data upstream to the next APU, which may also combine it with its own data, and so on.

This merging of I-Q data in each APU, which may be referred to as successive coherent combining, reduces the needed information bandwidth in the serial link (stripe), which otherwise would increase for every APU added in series. At the same time, signal sensitivity is significantly improved, as each APU can take advantage of cross-correlation information to determine how best to combine the data. Interference level in the system is reduced and thus the system capacity can be significantly improved. Each UE gets better SNR in the uplink, and can thus increase its bitrate. In URLL (ultra reliable, low latency) scenarios, better SNR and thus lower BER are obtained, thus reducing or eliminating time-consuming retransmissions.

Figure 6:
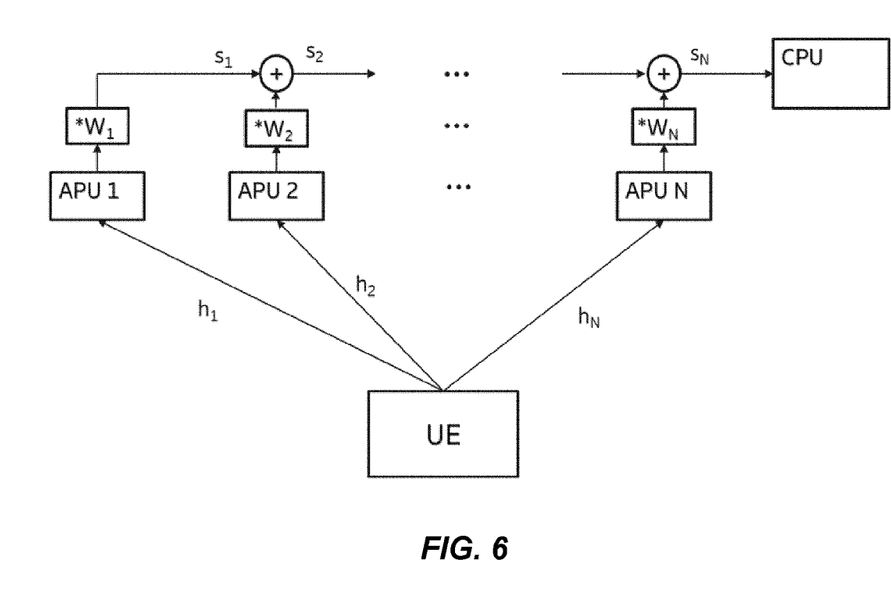
FIG. 6 is a block diagram illustrating fundamental principles of successive coherent combining.

FIG. 6 illustrates the fundamental principles of successive coherent combining of uplink signals. As noted above, a key issue is that there is a limited information path from the APUs to the CPU, and there may not be enough bandwidth to transfer information from each APU directly to the CPU, where, in an ideal scenario, the radio channels to each APU is estimated, antenna combining is performed, and, finally detection of uplink information is carried out. Instead, the techniques described herein use an architecture like that shown in FIG. 6, where the APUs (e.g., APU 1, APU 2, . . . . APU N) are placed in different spatial positions within the cell. The figure shows a subset of these APUs connected in series. At each APU, the signal from the previous APU (i.e., the next APU further downstream) is added, using a weighted addition, to the signal from the present APU. The resulting summed signal is transferred to the next APU.

This weighted summation may take the form of:

$$s_i = s_{i-1} + w_i^* r_i \text{ for } i \in \{1 \ldots N\}, s_0 = 0,$$

where $s_i$ is the combined signal information, $s_{i-1}$ is the signal information obtained from the previous APU, $r_i$ is the signal information obtained by APU i from the received radio signal, and $w_i$ is a weight parameter. Note that the signals and weights may be arrays in either or both of the time and subcarrier (frequency) dimensions.

Regarding the weight parameter, one solution to combining the signals as discussed in general terms above is for each APU to use reference symbols as received locally to estimate radio channels and then use weights proportional to the conjugate of the radio channel. This would create a Maximum Ratio Combining (MRC) receiver. However, because only a few of the resource elements in the received signal contain known reference signals, the quality of local channel estimates is limited.

Instead, successive coherent additions may be created in the following way, using information obtained from both the locally received signal and the signal information passed to an APU from a previous APU in the chain. With this approach, no channel estimation need be done at each APU. Instead, the weight factor(s) used by each APU is calculated from a correlation between signal delivered from the previous APU and the signal received by the present APU. Note that there is no requirement to only use reference symbols. All symbols can be used. The radio channel complexity determines how complex the weighting function needs to be, but in general terms, much more information is used to set the weights, using the presently disclosed techniques, which will mitigate the impact of noise.

Following is a simplified analysis, addressing only one symbol value per symbol time per subcarrier, and demonstrating the combining of signal information at an APU with index n. For a given communication, of course, there may be multiple symbols, communicated over resource elements spanning two dimensions, time and frequency (subcarriers). The simplified analysis shown below can be easily extended to a spatial multiplexing scenario, for instance, where there are multiple symbol values per symbol time per subcarrier.

A subset of the symbols in a given transmission are known reference symbols, e.g., DMRS, which are normally used to estimate the radio channel $h_i$ through which the associated data symbols were sent. For each symbol, this channel response for the radio channel between the UE and a given APU can be viewed as a complex number. The radio channel $h_i$ is not static over time and subcarriers, but may be considered so over a given window, the dimensions of which will vary depending on a particular spatial scenario in which the APUs are deployed. At each APU, averaging or transforming results over this window may be performed when defining a weighting parameter $w_i$, for application to the signal received at APU i.

The received signal at each APU i is given by:

$$r_i = s * h_i + n_i,$$

where s is the symbol transmitted by a wireless device to the APU, $n_i$ is added noise, and $h_i$ is the channel response for the channel between the UE and the APU.

Now, a relevant subset of symbols in a [time, subcarrier] window may be selected for use when calculating the weights. The basic assumption underlying this selection is that the radio channel can be assumed to be static over the window and that the radio channel for these symbols is relevant to (i.e., similar to the radio channel experienced by) the symbols for which the weight is being calculated. Define $\bar{s}_i$ and $\bar{r}_i$ as row vectors containing all relevant symbols at APU i in the defined window. Then, the weight to be applied to each symbol can be calculated as:

$$w_i = \frac{\bar{s}_{i-1} * \bar{r}_i^H}{|\bar{s}_{i-1} * \bar{r}_i^H|},$$

where $\bar{r}_i^H$ denotes the Hermitian transpose of $\bar{r}_i$. It will be appreciated that this calculates the correlation between the received symbols $\bar{r}_i$ and the corresponding symbols $\bar{s}_{i-1}$ in the signal information received from preceding APU i−1. The weight for the APU farthest away from the CPU in the chain (APU 1) is 1, since that APU is not receiving signal information from another APU. Thus, $w_1=1$.

Note that the result $w_i$ shown above is scalar. Of course, a given transmission might include symbols that are divided into several distinct windows in the time and/or frequency domains, in which case distinct weights may be calculated for each window. In that case, a given APU i may handle multiple weights $w_i$.

The combined signal for each symbol at APU i is then calculated according to:

$$s_i = s_{i-1} + w_i * r_i.$$

The combined signal vector for all of the symbols corresponding to the window for which $w_i$ was calculated may be calculated according to:

$$\bar{s}_i = \bar{s}_{i-1} + w_i * \bar{r}_i.$$

It should be appreciated that the "relevant" symbols in the window, which are used to calculate the weight $w_i$, may include both reference symbols and symbols carrying user data. Assuming that the selected symbols all experience a similar channel, the result is a more accurate estimate of the correlation than could be achieved using only the reference symbols. It should also be appreciated that additional steps may be used to further improve the correlation and thus improve the combining weights used to combine the signals from the APUs. For instance, the reference symbols received at APU i may be used to compensate the received symbols $r_i$ in an initial pre-compensation step, in some embodiments.

In the technique described above, the weight parameter used to combine the signals is calculated as a phase rotator. In other words, this approach uses pure phase rotations to align the signals, before combining. This is a robust and straightforward approach. However, in some variations of this technique, the combining may be performed to better approximate a maximum ratio combining (MRC) summation.

In an advanced antenna system (AAS) receiver having access to the signals from multiple receivers, with added uncorrelated Gaussian noise present in the signal from each receiver, it can be shown that the optimal receiver weights applied to each receiver's signal when combining the signals should follow the MRC solution. In the case of N antennas, which corresponds to a scenario of N APUs, the combined signal should thus be formed according to:

$$S = \frac{\sum_{i=1}^{N} h_i^* * r_i}{\sum_{i=1}^{N} |h_i|^2}.$$

This is the optimal weighting of the signals, incorporating both amplitude and phase into the weighting process, rather than just phase rotation. To carry out this calculation, however, requires knowledge of the channel response $h_i$ for each antenna/APU.

In the systems described above, where the APUs are linked serially, the received signal is summed iteratively, in each node, rather than combined in a single calculation. As described above, a correlation is obtained at each node, e.g., according to:

$$\bar{s}_{i-1} * \bar{r}_i.$$

With enough processing gain, this correlation, properly scaled, will represent the correlation between the effective channel for the signal information provided by the previous node and the channel response for the current node.

Assume that the output from node i−1 can be written as:

$$s_{i-1} = s * hs_{i-1} + ns_{i-1},$$

where s is the transmitted symbol, $s_{i-1}$ is the symbol (or combined symbol) information obtained from the previous APU in the chain, $hs_{i-1}$ is the effective channel for the symbol $s_{i-1}$ and $ns_{i-1}$ is the noise in the symbol (or combined symbol) $s_{i-1}$, having a variance of $\sigma^2$.

As above, the received signal at node i is:

$$r_i = s * h_i + n_i,$$

where $n_i$ is the noise in the received signal, also having variance of $\sigma^2$.

The target of the weighting in each node is to create an MRC-like scaling, giving a combined signal output, which can be provided to the next APU in the chain or to the CPU, that can be written as:

$$s_i = w_i^{(1)} * r_i + w_i^{(2)} * s_{i-1}.$$

The weight parameters $w_i^{(1)}$ and $w_i^{(2)}$ in this calculation are determined so as to achieve MRC-like weighting. Since noise power is scaled to remain at $\sigma^2$, the same method can be repeated until the last node. This will give MRC weights for the end result.

The weight parameters must be calculated using only known information. Since channel estimates are not explicitly estimated in each node, the weight parameters may be calculated as follows, where, to simplify writing, the amplitude of the received signal is assumed to be 1:

$$w_i^{(1)} = \frac{c_i}{\sqrt{|hs_{i-1}|^2 + |h_i|^2}}, \text{ and}$$

$$w_i^{(2)} = \frac{|hs_{i-1}|}{\sqrt{|hs_{i-1}|^2 + |h_i|^2}}.$$

Here, the following known information is used: $|hs_{i-1}|^2 = \bar{s}_{i-1} * s_i^H - \sigma^2$ is a power estimate of the effective channel for the output $s_{i-1}$ provided to APU i by APU i−1. $|h_i|^2 = r_i * \bar{r}_i^H - \sigma^2$ is a power estimate of the channel from the transmitting wireless device to APU i. $\sigma^2$ is the estimated noise power, which is assumed to be equal in all nodes. Note that the power can be estimated in many known ways, since it changes slowly. Finally, $$c_i = \frac{\bar{s}_{i-1} * \bar{r}_i^H}{|hs_{i-1}|}$$

is the scaled correlation between the received input in APU i and the output signal obtained from APU i−1. Note that the vectors $\bar{s}_{i-1}$ and $\bar{r}_i$ include the set of symbols for each of the resource elements used in the correlation, e.g., according to a window in the time and/or frequency domains. Proper scaling has to be ensured that the correlation calculation gives the expected value of the correlation without being scaled by the number of elements in the vector.

The following analysis shows that the weight parameters calculated according to the above approach yield an MRC-like result. For analysis purposes, only the combination of a symbol for one resource element, for a first and second node, is considered.

Assume that the channel responses for the first and second nodes are, respectively:

$h_1 = a_1 e^{j\varphi 1}$, and $h_2 = a_2 e^{j\varphi 2}$.

Then:

$|hs_1|^2 = a_1^2$, since in this case $s_1 = h_1 + n_1$;

$|hs_2|^2 = a_2^2$; and $c_2 = a_2 e^{j(\varphi_1 - \varphi_2)}$.

The optimum successive combining weights are then:

$$w_2^{(1)\prime} = \frac{|hs_1|}{\sqrt{|hs_1|^2 + |hs_2|^2}} = \frac{a_1}{\sqrt{a_1^2 + a_2^2}} = e^{j\varphi_1}\left(\frac{h_1^*}{\sqrt{|h_1|^2 + |h_2|^2}}\right),$$

and $$w_2^{(2)\prime} = \frac{c_2}{\sqrt{|hs_1|^2 + |hs_2|^2}} = \frac{a_2 e^{j(\varphi_1 - \varphi_2)}}{\sqrt{a_1^2 + a_2^2}} = e^{j\varphi_1}\left(\frac{h_2^*}{\sqrt{|h_1|^2 + |h_2|^2}}\right).$$

Comparing these optimum successive combining weights with the MRC weights obtained using the successive coherent combining technique described above, it can be seen that the weights are almost identical. The only difference is that in the MRC approach, the phase of the effective channel will have a nominal phase rotation equal to the channel rotation of the first node. This difference has no impact on result. It is still a maximum ratio combination over all signals received on different nodes, scaled to maintain the variance of the noise.

Transforms can be applied to correlations like those obtained using the formula above to obtain weights that are smoothed in the subcarrier (frequency) and/or time domains. One such transform can be averaging the correlations over coherence bandwidth; another transform can be a cosine transform over subcarriers and then keep a low number of taps to be used in the weight calculation. Yet another transform is to assume line-of-sight (LOS) communication giving a correlation result equal to a phase rotation.

Figure 7:
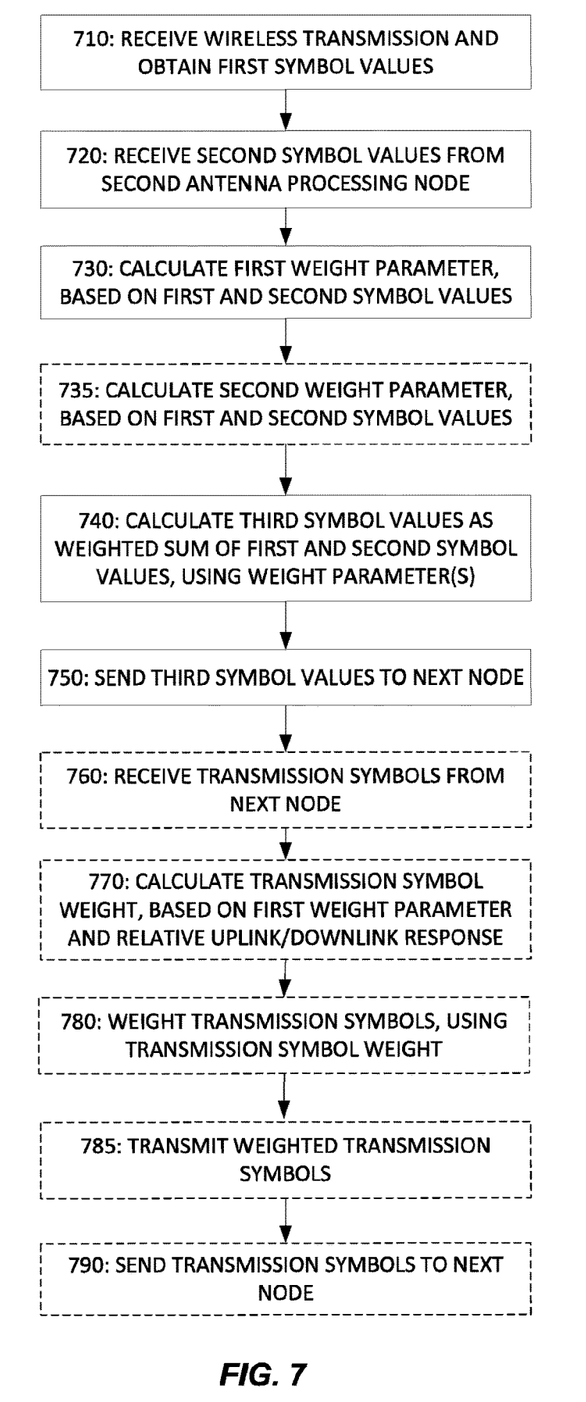
FIG. 7 is a process flow diagram illustrating an example method carried out by an antenna processing node, according to some embodiments.

In view of the explanation and examples provided above, it will be appreciated that FIG. 7 is a process flow diagram illustrating an example method according to some of the above-described techniques, as implemented in a first antenna processing node of a distributed wireless system that comprises a controlling node, the first antenna processing node, and one or more additional antenna processing nodes, where each of the antenna processing nodes being communicatively coupled to the controlling node but spatially separated from each other and from the controlling node. Note that the term "first antenna processing node" is not intended to suggest that the antenna processing node is the first node in an ordered series of nodes, but is instead simply used to distinguish the "first" antenna processing node from other antenna processing nodes. In fact, the illustrated method is from the perspective of a "middle" antenna processing node, in the sense that this antenna processing node both receives symbol values from a node, e.g., a node further downstream in a chain, and passes combined symbol values upstream, to yet another node. Note also that the term "antenna processing node" is intended to be generic, and to include the APUs described above.

As shown at block 710, the illustrated method comprises receiving one or more wireless transmissions from a wireless device and obtaining first symbol values from the one or more wireless transmissions. In the context of an LTE or NR wireless transmission, for instance, this may comprise demodulating symbol values from a set of resource elements, e.g., in a resource block, using known techniques for demodulating an Orthogonal Frequency Division Multiple Access (OFDMA) or Single-Carrier Frequency Division Multiple Access (SCFDMA) signal. The result may be one or several received symbol values, which may be expressed as $\bar{r}_i$.

As shown at block 720, the method further comprises receiving second symbol values from a second antenna processing node, the second symbol values corresponding to the one or more wireless transmissions as received at the second antenna processing node. Note that these second symbol values may be the symbol values obtained by the second antenna processing node directly from its received signal, or may be combined symbol values. In either case, these second symbol values may be represented as $\bar{s}_{i-1}$.

As shown at block 730, the method continues with the calculating of at least a first weight parameter based on at least a subset of the first symbol values and a corresponding subset of the second symbol values. This may be done according to any of the several techniques described above, some of which are discussed in further detail below. This first weight parameter may be represented as $w_i$, for instance.

As shown at block 740 the method continues with the calculating of third symbol values by computing a weighted sum of the first symbol values and corresponding ones of the second symbol values, using the first weight parameter. These third symbol values may be represented as $\bar{s}_i$, for example. Finally, as shown at block 750, the method continues with sending the third symbol values to a third antenna processing node or to the controlling node.

As was discussed above, at least some of the plurality of first symbol values and corresponding ones of the second symbol values used to obtain the first weight parameter may correspond to traffic data, in some embodiments. Others may be reference symbols. It is possible, of course, to carry out the calculation of the weight parameter using only reference symbols, but using data symbols as well can yield an improved correlation value, and hence a better weight, under many circumstances.

As was shown in the detailed examples provided above, calculating the first weight parameter may comprise calculating a correlation between the subset of the first symbol values and the corresponding subset of the second symbol values. This may be done for example, by calculating the first weight parameter with for antenna processing node i according to:

$$w_i^{(1)} = \frac{\bar{s}_{i-1} * \bar{r}_i^H}{|\bar{s}_{i-1} * \bar{r}_i^H|},$$

where $\bar{r}_i$ is a row vector containing the subset of the first symbol values as received at the first antenna processing node, $\bar{s}_{i-1}$ is a row vector containing the corresponding subset of the second symbol values, and $\bar{r}_i^H$ denotes the Hermitian transpose of $\bar{r}_i$. In these embodiments, then, calculating the third symbol values comprises calculating each third symbol value according to $s_i = s_{i-1} + w_i^{(1)} * r_i$, where $r_i$ is a first symbol value as received at the first antenna processing node, $s_{i-1}$ is a corresponding second symbol value received from the second antenna processing node, and $w_i^{(1)}$ is the first weight parameter.

In some embodiments of the technique illustrated in FIG. 7, the second symbol values may be weighted as well, e.g., to perform an MRC-like combining. Thus, in some embodiments, the method comprises calculating a second weight parameter, in addition to the first weight parameter. This is shown at block 735, which is illustrated with a dashed outline to indicate that it need not be present in every embodiment or instance. In these embodiments, calculating the third symbol values comprises adding first symbol values, weighted by the first weight parameter, to second symbol values, weighted by the second weight parameter. In some of these embodiments, calculating the first weight parameter may comprise calculating the ratio of (i) a correlation of first symbol values and second symbol values, scaled by the square root of an estimated channel power corresponding to the second symbol values, to (ii) the square root of the sum of an estimated channel power corresponding to the first symbol values and the estimated channel power corresponding to the second symbol values; and calculating the second weight parameter comprises calculating the square root of the ratio of the estimated channel power corresponding to the first symbol values to the sum of the estimated channel power corresponding to the first symbol values and the estimated channel power corresponding to the second symbol values. These calculations may take the form of calculating the first weight parameter $w_i^{(1)}$ according to $$w_i^{(1)} = \frac{c_i}{\sqrt{|hs_{i-1}|^2 + |h_i|^2}}, \text{ where } c_i = \frac{\bar{s}_{i-1} * \bar{r}_i^H}{|hs_{i-1}|}, \bar{s}_{i-1}$$

is a row vector containing second symbol values received from the second antenna processing node, $\bar{r}_i$ is a row vector containing first symbol values as received at the first antenna processing node, $|h_i|^2 = \bar{r}_i * \bar{r}_i^H - \sigma^2$, $|hs_{i-1}|^2 = \bar{s}_{i-1} * \bar{s}_{i-1}^H - \sigma^2$ and $\sigma^2$ is an estimated noise power corresponding to the symbol values, and calculating the second weight parameter $w_i^{(2)}$ according to $$w_i^{(2)} = \frac{|hs_{i-1}|}{\sqrt{|hs_{i-1}|^2 + |h_i|^2}};$$

and calculating third symbol values comprises calculating each third symbol value according to $s_i = w_i^{(1)} * r_i + w_i^{(2)} * s_{i-1}$.

Note that in some embodiments, calculating the first weight parameter comprises using all of the first symbol values and all of the corresponding ones of the second symbol values, i.e., using all of the same symbol values that are subsequently used to calculate the third symbol values. However, the sets of symbol values used to calculate the weights and those used to calculate the third symbol values may overlap, or even completely differ, in some embodiments.

In some embodiments, for example, calculating the first weight parameter may comprise calculating the first weight parameter using one or more first symbol values corresponding to a first time interval, wherein calculating the third symbol values comprises applying the calculated one or more first weight parameters to first symbol values corresponding to a second time interval. In some embodiments, multiple weight parameters may be calculated, corresponding to different "windows," or regions, of time-frequency space. Thus, for example, the method may comprise calculating a plurality of first weight parameters for a given time interval, each first weight parameter corresponding to one of two or more distinct subsets of subcarriers from which corresponding first symbol values are obtained, and wherein calculating the third symbol values comprises applying each first weight parameter to a plurality of first symbol values obtained from the subset of subcarriers to which the first weight parameter corresponds.

In some embodiments, weight parameters may be smoothed, i.e., filtered. Thus, in some embodiments, calculating the first weight parameter may comprise smoothing the first weight parameter in the time domain or in the frequency domain, or both.

Downlink Weighting

Figure 8:
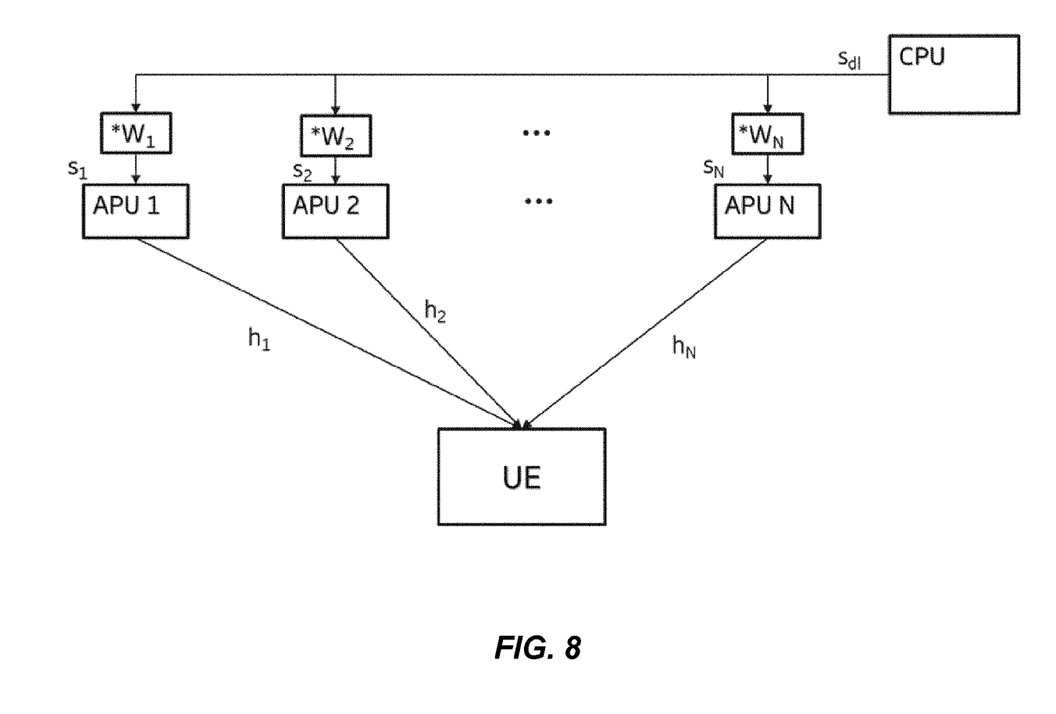
FIG. 8 illustrates the use of weights to enable coherent addition of radio signals at a wireless device.

In wireless systems using Time-Division Duplexing (TDD), uplink and downlink transmissions utilize the same portion of the frequency spectrum, which means that the uplink and downlink radio channels can be assumed, for at least some purposes, to be the same, a principle known as channel reciprocity. This in turn means that the weight parameters discussed above, which at least partly characterize the relative differences in the channels experienced by an uplink signal between two antenna processing units, can be used to adjust downlink transmissions by those same antenna processing units, so that the transmitted signals add constructively at the targeted wireless device. This is shown conceptually in FIG. 8. Note that the weights shown in FIG. 8 are not the same weights calculated for combining of uplink signals.

However, while the radio channel may be reciprocal, the transmitter and receiver circuitry in a given antenna processing unit are not. This means that to facilitate constructive addition of the downlink signals at the wireless device, the downlink signals should be further adjusted to account for the differences between the transmitter and receiver circuitry responses in each antenna processing unit, i.e., using receive/transmit calibration coefficients.

While the absolute responses of the transmitter and receiver circuits can be directly measured, under laboratory conditions, in practical deployments these responses are likely to vary, depending on deployment conditions. However, absolute knowledge of the transmitter and receiver responses is not needed. Rather, the relative uplink/downlink response can be combined with the receiver weights determined according to the above techniques to produce transmitter weights. For a given antenna, this relative response can be captured in a single complex-valued coefficient, which represents the ratio of the receiver and transmitter circuit responses, $r_i/t_i$, which may be expressed as $\delta_i$ and referred to as a relative uplink-to-downlink calibration coefficient.

Each antenna processing node might consist of several antenna elements. Methods to achieve alignment of signals at the antenna ports, which might be referred to as mutual coupling antenna calibration methods, are known. One example approach is described in Joao Vieria, Fredrik Rusek, & Fredrik Tufvesson, "A Receive/Transmit Calibration Technique Based on Mutual Coupling for Massive MIMO Base Stations," 2016 IEEE 27th Annual IEEE International Symposium on Personal, Indoor and Mobile Radio Communications—(PIMRC). These methods need knowledge of the coupling factor between antenna elements. This is possible within an APU but not between APUs.

There are also published methods describing how to create alignment between receive and transmit signals, using an uplink/downlink calibration factor. An example is given in Joao Viera, Fredrik Rusek, Ove Edfors, Steffen Malkowsky, Liang Liu, & Fredrik Tufvesson, "Reciprocity Calibration for Massive MIMO: Proposal, Modeling, and Validation," IEEE Transactions on Wireless Communications, Vol. 16, No. 5, May 2017. This method is well suited for reciprocal calibration where channel estimate is done on uplink and then used on downlink. If the $r_i/t_i$ is aligned over all antennas, then the reciprocal radio channel can be used. Rx/tx calibration is possible to perform between APUs.

Given the weight parameters described above, which are obtained by correlating uplink symbols received at a given antenna processing node with corresponding symbol information obtained from another antenna processing node, and given relative uplink/downlink response coefficients for each antenna processing node, transmit weights for application to downlink transmissions from the various antenna processing node can be determined, so as to facilitate constructive combination of the transmitted signals at a targeted wireless device.

According to this approach, a given antenna processing node receives, from an upstream node, a set of symbols to be transmitted to the wireless device. This step is shown at block 760 of FIG. 7. These may be referred to as transmission symbols. The upstream node may be a controlling node, e.g., a CPU as described above, for an antenna processing node that is closest to the controlling node/CPU in a serial chain of antenna processing nodes. For other antenna processing nodes in the chain, the upstream node will instead be another antenna processing node. After receiving the transmission symbols, the antenna process node will transmit them to the wireless device. However, before transmitting them, the transmission symbols should be adjusted to account for (a) the relative channel difference between the channels to the antenna processing node and the next antenna processing node, and (b) the relative uplink/downlink response for the antenna processing node. As discussed above, the first of these is captured in the weight parameters described in detail above, while the second is captured in relative uplink/downlink response coefficients.

Accordingly, the antenna processing node weights the transmission symbols, using a transmission symbol weight calculated from the relative uplink/downlink response for the antenna processing node and the receive weight parameter or parameters calculated according to the techniques described above. This is shown at block 770 in FIG. 7. This transmission symbol weight is then used to weight the transmission symbols received from the upstream node, to obtain weighted transmission symbols, which the antenna processing node then transmits to the wireless device, as shown at blocks 780 and 785.

In embodiments where only a single weight parameter is used by the antenna processing node in the uplink signal processing described above, the transmission symbol weight, which may be represented as $w_t$, may be calculated according to $$w_t = \frac{w_i^{(1)}}{\delta_i},$$

where $w_i^{(1)}$ is the first weight parameter and $\delta_i$ is a relative uplink-to-downlink calibration coefficient for the first antenna processing node. In these embodiments, each weighted transmission symbols may then be calculated according to $a_i^{(t)} = a_i w_t$, where $a_i^{(t)}$ is a transmission symbol as transmitted by the antenna processing node and $a_i$ is the transmission symbol as received from the upstream node.

In addition to transmitting the weighted transmission symbols to the wireless device, the antenna processing node should also pass the transmission symbols along to the next downstream node. This is shown at block 790 in FIG. 7. In embodiments where only a single receive weight parameter is used, the transmission symbols can be passed along to the next downstream node without modification.

This technique may be extended to cover embodiments where two weight parameters, $w_i^{(1)}$ and $w_i^{(2)}$, are used by the antenna processing node to calculate the combined uplink symbol values, as was described in detail above. It should be recalled that at each antenna processing node in this scenario, the first weight parameter $w_i^{(1)}$ is used by the antenna processing node to weight uplink symbols as received by the antenna processing node itself, while the second weight parameter $w_i^{(2)}$ is used by the antenna processing node to weight the symbol information provided to it by the next downstream antenna processing node. In this case, the weighted transmission symbols need to be calculated based on the product of the first weight parameter $w_i^{(1)}$ and each second weight parameter used by any antenna processing nodes upstream of the antenna processing nodes, e.g., according to $$w_t = \frac{w_i^{(1)}}{\delta_i} * w_{i+1}^{(2)} * w_{i+2}^{(2)} \ldots * w_N^{(2)}.$$

This can be accommodated by simply having each antenna processing node weight the transmission symbols that it receives from an upstream node by the second receive weight it has calculated according to the above techniques, i.e., by $w_i^{(2)}$, before passing on to the next downstream antenna processing node. If a transmission symbol received from an upstream antenna processing node i is denoted $a_i$, then the transmission symbol passed to the next downstream antenna process node can be calculated according to $a_{-i} = a_i w_i^{(2)}$. Note that this scaling factor $w_i^{(2)}$ is a real number, and imparts no phase rotation. This scaling factor is used to balance signal levels in an MRC-like way. In practice, other transmitter constraints will limit transmitter signals, one being that the total power of the transmitted signals will be targeted to have a certain peak value. The techniques described here can be readily modified to accommodate such constraints.

Figure 9:
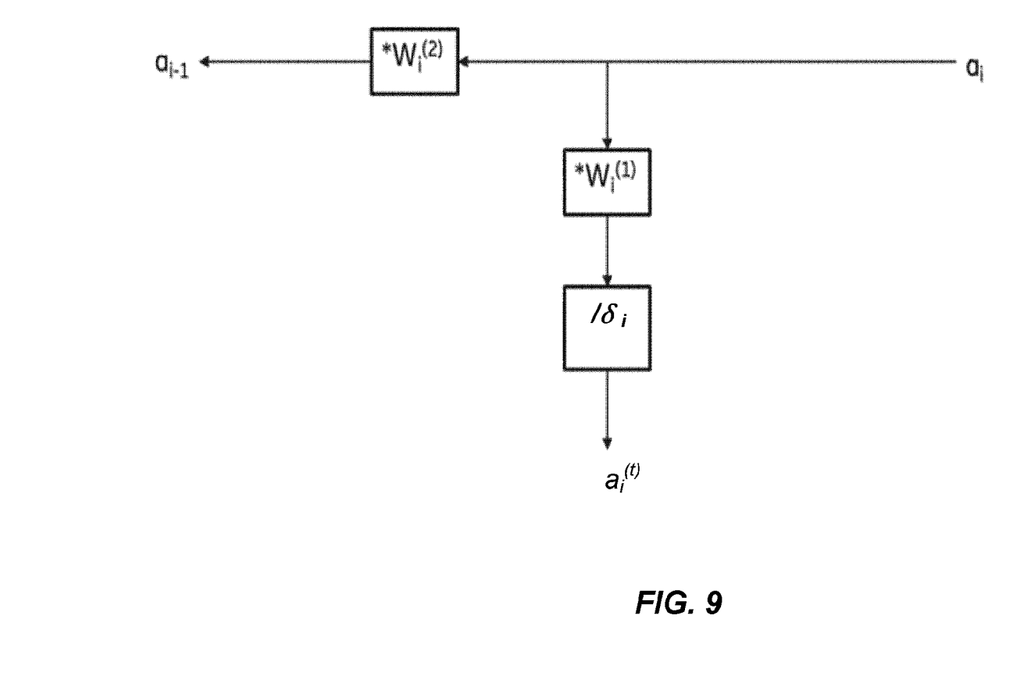
FIG. 9 illustrates the handling of transmission symbols at an antenna processing node.

FIG. 9 illustrates, conceptually, the handling of transmission symbols $a_t$ for the case described above, where two receive weights $w_i^{(1)}$ and $w_i^{(2)}$ are calculated by antenna processing node i.

Referring again to FIG. 4, this figure is a block diagram illustrating an example antenna processing node 400, according to some embodiments. Antenna processing node 400 includes radio circuitry 410 and antennas 415, processing circuit 420, and serial interface circuitry 430, which includes a first serial interface 432, facing "upstream" towards a controlling node, as well as a second serial interface 434, facing "downstream," towards one or more subsequent antenna processing nodes. It will be appreciated that when antenna processing node is the last antenna processing node in a chain, the second serial interface 434 is unused.

The antenna processing node 400 shown in FIG. 4 is illustrated with multiple antenna elements 415. In practice, an antenna processing node 400 may have one or several antenna elements. It should be appreciated that the techniques for calculating receive and transmit weights described above may be considered as producing weights that are applicable to a single "effective" antenna for the antenna processing node. If the antenna processing node has only a single antenna, the weights are directly applicable to the signals transmitted and received via that antenna. If the antenna processing node has multiple antenna elements, the weights calculated according to the techniques above apply to a combined signal. For uplink signals, the signals received at each of the node's antenna elements will typically be combined using antenna-specific combining weights to produce this combined signal. For downlink signals, the transmission weight described above may be applied to the transmission symbol along with antenna-specific transmit weights to produce the desired transmit signal.

Radio circuitry 410 includes receive (RX) and transmit (TX) functionality for communicating with one or more wireless devices via antennas 415. For downlink communications, i.e., radio communications to one or more wireless devices, the radio circuitry 410 includes TX circuitry 414 configured to receive baseband information relayed to the radio circuitry 410 from a controlling node, via the upstream serial interface 432 and the processing circuit 420. TX circuitry 414 includes upconverter circuits, power amplifier circuits, and filter circuits to convert this baseband information to radio frequency and condition it for transmission to one or more wireless devices. For uplink communications, i.e., radio communications from one or more wireless devices, the radio circuitry 410 includes RX circuitry 412 configured to receive wireless transmissions via antennas 415, amplify, filter, and downconvert the received transmissions, and sample the downconverted transmissions to obtain soft information corresponding to the received wireless transmission. This soft information may be in the form of I-Q samples, for instance, and may be interchangeably referred to as soft bits or soft bit information.

Processing circuit 420 includes one or more processors 424, controllers, or the like, coupled to memory 426, which may comprise one or several types of memory, such as random-access memory, read-only memory, flash memory, etc. Stored in memory 426 may be computer program code for execution by processor(s) 424, including program code configured to control the radio circuitry 410 and serial interface circuitry 430 and to cause the antenna processing node 400 to carry out any one or more of the techniques described herein, such as the methods discussed above in connection with FIG. 7. Again, it will be appreciated that the computer program code, whether instantiated in memory 426 or stored or communicated elsewhere, may be regarded as a "computer program product," and that embodiments of the presently disclosed invention include such computer program products.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, in a first antenna processing node of a distributed wireless system that comprises a controlling node, the first antenna processing node, and one or more additional antenna processing nodes, each of the antenna processing nodes being communicatively coupled to the controlling node but spatially separated from each other and from the controlling node, the method comprising:
receiving one or more wireless transmissions from a wireless device and obtaining first symbol values from the one or more wireless transmissions;
receiving second symbol values from a second antenna processing node, the second symbol values corresponding to the one or more wireless transmissions as received at the second antenna processing node;
calculating a first weight parameter based on at least a subset of the first symbol values and a corresponding subset of the second symbol values;
calculating third symbol values by computing a weighted sum of first symbol values and corresponding ones of the second symbol values, using the first weight parameter; and
sending the third symbol values to a third antenna processing node or to the controlling node.

2. The method of claim 1, wherein at least some of the plurality of first symbol values and corresponding ones of the second symbol values correspond to traffic data.

3. The method of claim 1, wherein calculating the first weight parameter comprises calculating a correlation between the subset of the first symbol values and the corresponding subset of the second symbol values.

4. The method of claim 3, wherein:
calculating the first weight parameter comprises calculating the first weight parameter $w_i^{(1)}$ for antenna processing node i according to:

$$w_i^{(1)} = \frac{\overline{s}_{i-1} * \overline{r}_i^H}{\left|\overline{s}_{i-1} * \overline{r}_i^H\right|},$$

where $\overline{r}_i$ is a row vector containing the subset of the first symbol values as received at the first antenna processing node, $\overline{s}_{i-1}$ is a row vector containing the corresponding subset of the second symbol values, and $\overline{r}_i^H$ denotes the Hermitian transpose of $\overline{r}_i$.

5. The method of claim 4, wherein calculating third symbol values comprises calculating each third symbol value according to $s_i = s_{i-1} + w_i^{(1)} * r_i$, where $r_i$ is a first symbol value as received at the first antenna processing node, and $s_{i-1}$ is a corresponding second symbol value received from the second antenna processing node.

6. The method of claim 1, wherein the method comprises calculating a second weight parameter, in addition to the first weight parameter, and wherein calculating the third symbol values comprises adding first symbol values, weighted by the first weight parameter, to second symbol values, weighted by the second weight parameter.

7. The method of claim 6, wherein:
calculating the first weight parameter comprises calculating the ratio of (i) a correlation of first symbol values and corresponding second symbol values, scaled by the square root of an estimated channel power corresponding to the second symbol values, to (ii) the square root of the sum of an estimated channel power corresponding to the first symbol values and the estimated channel power corresponding to the second symbol values; and
calculating the second weight parameter comprises calculating the square root of the ratio of the estimated channel power corresponding to the first symbol values to the sum of the estimated channel power corresponding to the first symbol values and the estimated channel power corresponding to the second symbol values.

8. The method of claim 7, wherein:
calculating the first weight parameter comprises calculating the first weight parameter $w_i^{(1)}$ according to $$w_i^{(1)} = \frac{c_i}{\sqrt{|hs_{i-1}|^2 + |h_i|^2}}, \text{ where } c_i = \frac{\overline{s}_{i-1} * \overline{r}_i^H}{|hs_{i-1}|}, \overline{s}_{i-1}$$

is a row vector containing second symbol values received from the second antenna processing node, $\overline{r}_i$ is a row vector containing first symbol values as received at the first antenna processing node, $|h_i|^2 = r_i * \overline{r}_i^H - \sigma^2$, $|hs_{i-1}|^2 = \overline{s}_{i-1} * s_i^H - \sigma^2$ and $\sigma^2$ is an estimated noise power corresponding to the symbol values;
calculating the second weight parameter comprises calculating the second weigh parameter $w_i^{(2)}$ according to $$w_i^{(2)} = \frac{|hs_{i-1}|}{\sqrt{|hs_{i-1}|^2 + |h_i|^2}};$$

and
calculating the third symbol values comprises calculating each third symbol value according to $s_i = w_i^{(1)} * r_i + w_i^{(2)} * s_{i-1}$.

9. The method of claim 7, wherein the method further comprises
receiving transmission symbols from the third antenna processing node or the controlling node;
calculating a transmission symbol weight based on the first weight parameter and based on one or more transmit-receive calibration parameters;
weighting the transmission symbols using the transmission symbol weight, to obtain weighted transmission symbols; and
transmitting the weighted transmission symbols to the wireless device.

10. The method of claim 9, further comprising:
weighting the transmission symbols with the second weight parameter and sending the transmission symbols weighted with the second weight parameter to the second antenna processing node.

11. The method of claim 1, wherein calculating the first weight parameter comprises using all of the first symbol values and all of the corresponding ones of the second symbol values.

12. The method of claim 1, wherein calculating the first weight parameter comprises calculating the first weight parameter using one or more first symbol values corresponding to a first time interval, and wherein calculating the third symbol values comprises applying the calculated one or more first weight parameters to first symbol values corresponding to a second time interval.

13. The method of claim 1, wherein the method comprises calculating a plurality of first weight parameters for a given time interval, each first weight parameter corresponding to one of two or more distinct subsets of subcarriers from which corresponding first symbol values are obtained, and wherein calculating the third symbol values comprises applying each first weight parameter to a plurality of first symbol values obtained from the subset of subcarriers to which the first weight parameter corresponds.

14. The method of claim 1, wherein calculating the first weight parameter comprises smoothing the first weight parameter in the time domain or in the frequency domain, or both.

15. The method of claim 1, wherein the method further comprises:
receiving transmission symbols from the third antenna processing node or the controlling node;
calculating a transmission symbol weight based on the first weight parameter and based on one or more transmit-receive calibration parameters;
weighting the transmission symbols using the transmission symbol weight, to obtain weighted transmission symbols; and
transmitting the weighted transmission symbols to the wireless device.

16. The method of claim 15, wherein:
calculating the transmission symbol weight comprises calculating the transmission symbol weight $w_t$ according to $$w_t = \frac{w_i^{(1)}}{\delta_i},$$

where $w_i^{(1)}$ is the first weight parameter and $$\delta_i = \frac{r_i}{t_i}$$

is a relative downlink-to-uplink calibration parameter for the first antenna processing node; and weighting the transmission symbols using the transmission symbol weight comprises calculating each weighted transmission symbols according to $a_i^{(t)}=a_i w_i$, where $a_i$ is a transmission symbol as transmitted by the antenna processing node and $a_i^{(t)}$ is a weighted transmission symbol for transmitting to the wireless device.

17. The method of claim 15, further comprising sending the transmission symbols to the second antenna processing node.

18. An antenna processing node, for use in a distributed wireless system that comprises a controlling node, the antenna processing node, and one or more additional antenna processing nodes, each of the antenna processing nodes being communicatively coupled to the controlling node but spatially separated from each other and from the controlling node, wherein the antenna processing node comprises:
    radio circuitry configured to communicate wirelessly with one or more wireless devices;
    serial interface circuitry configured to communicate over a serial link with the controlling node; and
    a processing circuit operatively coupled to the serial interface circuitry and configured to:
        receive one or more wireless transmissions from a wireless device and obtain first symbol values from the one or more wireless transmissions;
        receive second symbol values from a second antenna processing node, the second symbol values corresponding to the one or more wireless transmissions as received at the second antenna processing node;
        calculate a first weight parameter based on at least a subset of the first symbol values and a corresponding subset of the second symbol values;
        calculate third symbol values by computing a weighted sum of first symbol values and corresponding ones of the second symbol values, using the first weight parameter; and
        send the third symbol values to a third antenna processing node or to the controlling node.

19. A non-transitory computer-readable medium comprising, stored thereupon, a computer program product comprising program instructions for execution by a processing circuit in a first antenna processing node of a distributed wireless system that comprises a controlling node, the first antenna processing node, and one or more additional antenna processing nodes, each of the antenna processing nodes being communicatively coupled to the controlling node but spatially separated from each other and from the controlling node, the program instructions being configured to cause the first antenna processing node to:
    receive one or more wireless transmissions from a wireless device and obtain first symbol values from the one or more wireless transmissions;
    receive second symbol values from a second antenna processing node, the second symbol values corresponding to the one or more wireless transmissions as received at the second antenna processing node;
    calculate a first weight parameter based on at least a subset of the first symbol values and a corresponding subset of the second symbol values;
    calculate third symbol values by computing a weighted sum of first symbol values and corresponding ones of the second symbol values, using the first weight parameter; and
    send the third symbol values to a third antenna processing node or to the controlling node.

* * * * *